(12) United States Patent
Aiello

(10) Patent No.: US 7,531,151 B1
(45) Date of Patent: May 12, 2009

(54) POWDERED METALS EXTRACTED FROM ACID MINE DRAINAGE AND THEIR USE IN THE MANUFACTURE OF PRESSED METAL ARTICLES

(75) Inventor: James R. Aiello, Ridgeway, PA (US)

(73) Assignee: Saint Marys Pressed Metal, Inc., Ridgway, PA (US)

( * ) Notice: Subject to any disclaimer, the term of this patent is extended or adjusted under 35 U.S.C. 154(b) by 269 days.

(21) Appl. No.: 11/368,273

(22) Filed: Mar. 3, 2006

Related U.S. Application Data

(60) Provisional application No. 60/642,938, filed on Mar. 4, 2005.

(51) Int. Cl.
*C02F 11/12* (2006.01)
*C02F 103/10* (2006.01)

(52) U.S. Cl. .......... 423/150.3; 75/746; 75/751

(58) Field of Classification Search ......... 210/702–766; 428/548–569; 423/138–154
See application file for complete search history.

(56) References Cited

U.S. PATENT DOCUMENTS

| | | | | |
|---|---|---|---|---|
| 3,330,630 A | * | 7/1967 | Oakley | 75/246 |
| 4,018,680 A | | 4/1977 | Kupfer | 210/50 |
| 4,425,286 A | | 1/1984 | Kennedy | 264/8 |
| 4,451,429 A | | 5/1984 | Berg | 419/33 |
| 4,525,206 A | | 6/1985 | Soled et al. | 75/0.5 BA |
| 4,557,767 A | | 12/1985 | Hwang | 148/23 |
| 4,619,715 A | | 10/1986 | Hwang | 148/23 |
| RE32,309 E | | 12/1986 | Hwang | 148/23 |
| 4,988,487 A | | 1/1991 | Lai et al. | 423/21.5 |
| 5,346,529 A | | 9/1994 | Petterson | 75/252 |
| 5,427,691 A | * | 6/1995 | Kuyucak et al. | 210/713 |
| 5,616,251 A | | 4/1997 | Batarseh | 210/725 |
| 5,766,478 A | * | 6/1998 | Smith et al. | 210/638 |
| 5,903,815 A | | 5/1999 | Scott | 428/564 |
| 5,954,969 A | * | 9/1999 | Hedin | 210/709 |

(Continued)

FOREIGN PATENT DOCUMENTS

| UA | 15 119 U | 6/2006 |
|---|---|---|

OTHER PUBLICATIONS

Susan Van Scoyoc, Evaluation of acid mine drainage sludge materials for metallurgical application in support of the resource recovery institute, Frank J. Pasquerilla Conference Center, Johnstown, PA, Nov. 17, 2004.—In Applicant's IDS.*

(Continued)

*Primary Examiner*—Roy King
*Assistant Examiner*—Mark L Shevin
(74) *Attorney, Agent, or Firm*—Robert D. Buyan; Stout, Uxa, Buyan & Mullins

(57) ABSTRACT

Acid mine drainage is treated to form a wet meal-containing precipitate. Such wet metal containing precipitate is dried and processed to form a powder which contains one or more metals. The powder (alone or in combination with other metal powders or other additives) is then compressed (e.g., pressed in a die, rolled, extruded) and sintered to form a desired sintered metal article. In some embodiments, the sintered metal article may be subjected to one or more secondary processes (e.g., oil impregnation, resin impregnation, metal infiltration, copper infiltration, heat treating, steam oxidizing, plating and secondary machining) to alter the strength, configuration or other property of the pressed metal article.

18 Claims, 4 Drawing Sheets

U.S. PATENT DOCUMENTS

| | | | |
|---|---|---|---|
| 6,132,486 A | 10/2000 | Dixon | 75/247 |
| 6,689,184 B1 | 2/2004 | Morris | 75/246 |
| 6,756,118 B2 | 6/2004 | Aichele et al. | 428/403 |
| 6,790,352 B1 | 9/2004 | Wurzburger et al. | 210/195.1 |
| 6,962,662 B2 | 11/2005 | Wurzburger | 210/709 |
| 7,033,507 B2 | 4/2006 | Zhuang | 210/714 |

OTHER PUBLICATIONS

H. Pfestor, Bearing Materials, in Ullmann's Encyclopedia of Industrial Chemistry, Jun. 15, 2000, p. 1-24.*

Robert S. Hedin, Recovery of marketable iron oxide from mine drainage in the USA, Land Contamination & Reclamation, vol. 11, No. 2, 2003, p. 93-97.*

"2004 Winners of EnviroExcellence Award" ,News Release from Pennsylvania Department of Environmental Protection, 2004.*

"DEP Promotes Recovery of Metals from Acid Mine Drainage as Economic Driver" News Release from Pennsylvania Department of Environmental Protection, Nov. 17, 2004.*

Hedin Environmental Webpage, "Lowber", 2007.*

Henri Cohrt and Martin Enders, "Sintered Steel and Iron" in Ullmann's Encyclopedia of Industrial Chemistry, Jun. 15, 2000, p. 1-29.*

Scoyoc, Susan Van, *Evaluation of Acid Mine Drainage Sludge Materials for Metallurgical Applications in Support of the Resource Recovery Initiative* [slide presentation]. Concurrent Technologies Corporation, Nov. 17, 2004, Frank J. Pasquerilla Conference Center, Johnstown, Pennsylvania.

* cited by examiner

```
┌─────────────────────────────────┐
│ Obtain Metal Containing Precipitate │
│ From Acid Mine Drainage             │
└─────────────────────────────────┘
                │
                ▼
┌─────────────────────────────────┐
│        Dry Precipitate          │
└─────────────────────────────────┘
                │
                ▼
┌─────────────────────────────────┐
│    Crush and Screen Dried       │
│    Precipitate to From Powder   │
└─────────────────────────────────┘
                │
                ▼
┌─────────────────────────────────┐
│   Optionally Combine Powder     │
│   With Lubricant and/or Other   │
│           Additives             │
└─────────────────────────────────┘
                │
                ▼
┌─────────────────────────────────┐
│  Optionally Remove Unwanted     │
│    Metals and/or Add            │
│     Supplemental Metal          │
└─────────────────────────────────┘
```

*Fig. 1*

POWDERED METALS EXTRACTED FROM ACID MINE DRAINAGE AND THEIR USE IN THE MANUFACTURE OF PRESSED METAL ARTICLES

RELATED APPLICATION

This patent application claims priority to U.S. Provisional Patent Application No. 60/642,938 filed on Mar. 4, 2005, the entirety of which is expressly incorporated herein by reference.

FIELD OF THE INVENTION

The present invention relates generally to environmental clean up and powdered metal technologies, and more particularly to the extraction and use of powdered metals from acid mine drainage precipitates.

BACKGROUND OF THE INVENTION

In surface mining operations (e.g., "strip mining" operations), large areas of land are typically excavated to uncover seams of coal and other minerals. Substantial amounts of the uncovered coal or other minerals are then removed, but quantities of residual coal, rocks and other debris remain exposed to rainwater and air after the surface mining operation has been completed. These exposed quantities of residual coal, rocks and other debris are known as "trailings."

Surface mine trailings often contain substantial amounts of pyrite, an iron sulfide. When air and water come into contact with the pyrite contained in the surface mine trailings, chemical reaction(s) take place, converting the pyrite to acid and dissolved iron. As the pH of the solution rises, the dissolved iron flocculates or participates.

For example, in one such acid forming reaction, pyrite undergoes oxidation to form a ferric hydroxide flocculent or precipitant known as "Yellowboy" and sulfuric acid. This reaction generates two moles of acidity for each mole of pyrite oxidized, as follows:

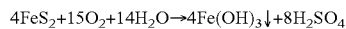

$$4FeS_2 + 15O_2 + 14H_2O \rightarrow 4Fe(OH)_3\downarrow + 8H_2SO_4$$

Pyrite+Oxygen+Water→"Yellowboy"+Sulfuric Acid

In another acid forming reaction, ferrous iron is converted to ferric iron. It is believed that, in certain areas, the presence of indigenous bacteria may increase the rate at which ferrous iron is converted to ferric iron, as follows:

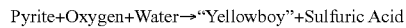

$$4Fe^{2+} + O_2 + 4H^+ \rightarrow 4Fe^{3+} + 2H_2O$$

Ferrous Iron+Oxygen+Acidity→Ferric Iron+Water

The rate of this reaction is pH dependant. Under severely acidic conditions (pH 2-3), this reaction proceeds relatively slowly in the absence of the needed types of bacteria. However, in the presence of certain bacteria, the pH may be around 5 and this reaction may proceed much more quickly. Thus, this particular reaction is believed to be the rate determining step in the overall acid-generating sequence.

The third type of acid forming reaction that is known to occur is the hydrolysis of iron. This hydrolysis essentially results in the formation of ferric hydroxide and the splitting of water molecules, as follows:

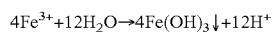

$$4Fe^{3+} + 12H_2O \rightarrow 4Fe(OH)_3\downarrow + 12H^+$$

Ferrous Iron+Water→Ferric Hydroxide+Hydrogen

In this reaction, three moles of acidity are formed from each mole of iron that undergoes hydrolysis. The ferric hydroxide formed will precipitate in solid form when the pH is raised above about 3.5. However, most of the ferric hydroxide remains in solution so long as the pH is below about 3.5.

Such acid-forming reactions can result in the formation of acid mine drainage. The term "acid mine drainage" generally refers to run off from mine areas where rainwater has become combined with acid and dissolved metal, such as iron. Acid mine drainage that has a high iron content may have a red or orange color. Due to its acid pH, acid mine drainage may also dissolve other heavy metals it comes into contact with, including copper, lead, or mercury. Acid mine drainage has been known to have deleterious effects on lakes, streams and groundwater and may contaminate drinking water and damage natural habitat.

Various active and passive techniques have been developed for removing acid and dissolved metals from acid mine drainage to render it less damaging to the environment. The passive techniques that have been used to date include; compost wetlands, anaerobic wetlands, open limestone channels, diversion wells, anoxic limestone drains, vertical flow reactors, and microbiological processes (e.g., the Pyrolusite® process). The active techniques that have been heretofore utilized generally involve the addition of alkaline chemicals (e.g., calcium carbonate, sodium hydroxide, sodium bicarbonate or anhydrous ammonia) to raise the pH of acid mine drainage to acceptable levels and to decrease the solubility of dissolved metals, thereby causing the metals to settle out as precipitates (e.g., sludge). The collection and disposal (e.g., trucking away to landfills) of such precipitates (e.g., sludge) can be laborious and costly. Thus, there exists a need in the art for the development of new methods for extracting or isolating metals from the acid mine drainage precipitates and for utilizing such extracted or isolated metals to form articles of manufacture.

SUMMARY OF THE INVENTION

The present invention provides methods for recovering metal(s) (e.g., metal powder) from acid mine drainage and methods for using such recovered metals to form pressed metal articles of manufacture, such as a bearings, gears, rings, housings, bushings, cams, rollers, levers, sprockets, housings, pillow blocks, clamps, structural parts and various other articles.

In accordance with the invention, there are provided metal-containing powder preparations useable to form pressed metal articles and methods for preparing such metal containing powder preparations. In general, the method for preparing the metal containing powder preparation comprises the steps of: a) treating metal-containing acid mine drainage to cause the formation of a wet metal-containing precipitate composition, b) drying the wet metal-containing precipitate to form a dry metal-containing precipitate composition; and c) processing the dry metal-containing precipitate composition to form a powder that contains or consists of metal. In some cases, Step b may be performed by heating the wet metal-containing precipitate to a temperature that facilitates drying (e.g., 400 F-2070 F). In some cases, supplemental amounts of metal powder(s) may be added to the powder obtained in Step C to provide the desired content and/or ratio of metal(s) for use in a specific application. These added supplemental metal powders may be virgin or substantially pure metal powders (e.g., those containing about 98% or more of desired metal(s) and/or those meeting applicable ASTM powdered metal standards such as ASTM-B783 (ferrous metal powder) or ASTM- B438 (non-ferrous metal powder). Examples of substantially pure metal powders that may be combined with powder obtained from the acid mine drainage precipitate powder of the present invention include but are not limited to 1000B Iron Powder available from Hoeganaes Corp., Riverton, N.J. and MAB-0 Copper-Tin Powder available from SCM Corporation, Research Triangle Park, N.C.

Further in accordance with the invention, there are provided methods for manufacturing pressed metal articles using metal powders that have been obtained from acid mine drainage. The methods by which such pressed metal articles may be manufactured generally comprise the steps of: a) providing a powder that contains or consists of metal that has been prepared from acid mine drainage by a method of the present invention; b) placing the powder that contains or consists of in a die or other from; c) compacting the powder within the die or other from to create a compacted pressed metal article; and d) sintering the compacted pressed metal article. Additives, such as lubricant (e.g., a paraffin based or similar lubricant such as Acrawax® Synthetic Wax/Ethylene Bis-Stearamide Wax available commercially from Lonza Group, Ltd., Basel, Switzerland) may be added to facilitate compaction of the powder and/or release of the compacted article from the die or other form. The compacting of the article in Step c may be accomplished by placing the die or other form in a press (e.g., a mechanical or hydraulic press) and using the press to apply a force to the die or form that is sufficient to compact the powder contained within the die or form to create the compacted pressed metal article (e.g., typically from about 15 tons per square inch to 70 tons per square inch). The sintering process of Step d may be carried out by heating the compacted pressed metal article to a temperature that causes sintering of the metal particles within the powder. In this regard, the compacted pressed metal article may be heated to a sintering temperature (e.g., from about 1100° F. to about 2070° F.), maintained at such sintering temperature for a time period (e.g., from about 20 minutes to about 3 hours depending on the size, density and metallurgical composition of the article) and then cooled.

In some embodiments of the invention, pressed metal articles of the present invention may be subjected to one or more secondary processes to alter the strength, configuration or other property of the pressed metal article. Examples of such secondary processes include oil impregnation, resin impregnation, metal infiltration, copper infiltration, heat treating, steam oxidizing, plating and secondary machining.

Further elements, aspects and objects of the present invention may be appreciated from the detailed description set forth herebelow and the accompanying figures.

BRIEF DESCRIPTION OF THE DRAWINGS

FIG. 1 is a flow diagram generally showing a process for preparing powdered metal in accordance with a method of the present invention.

DETAILED DESCRIPTION

The following detailed description, the accompanying drawings and the above-set-forth Brief Description of the Drawings are intended to describe some, but not necessarily all, examples or embodiments of the invention. The contents of this detailed description do not limit the scope of the invention in any way.

Figure 2:
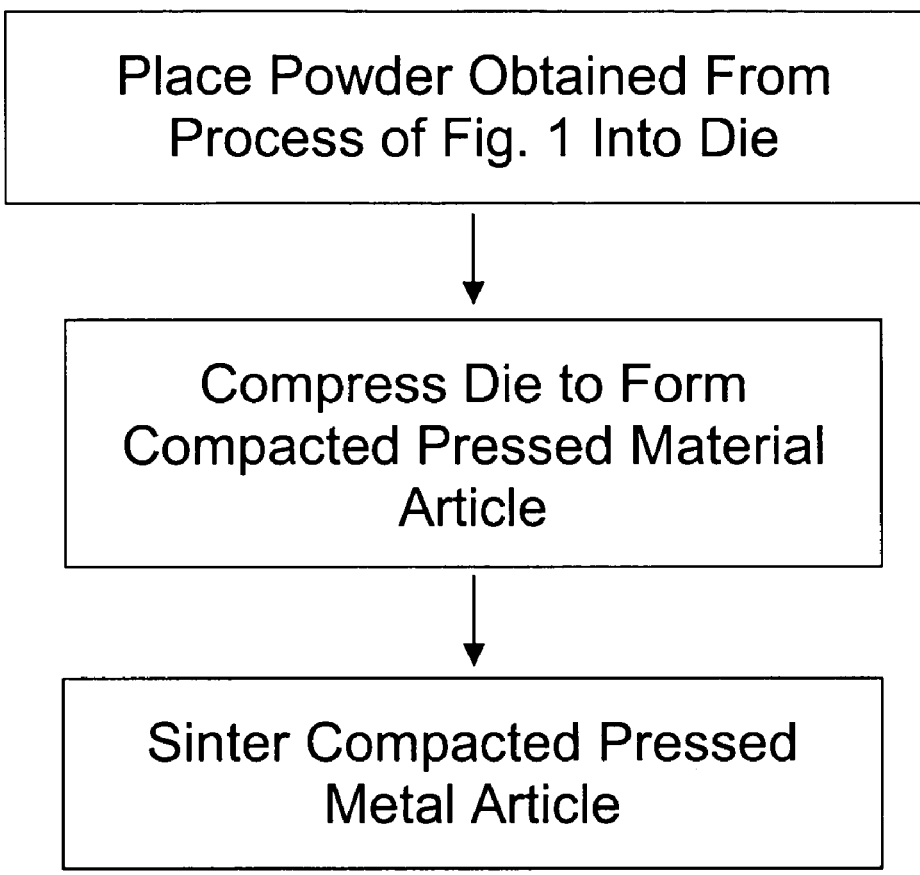
FIG. 2 is a flow diagram generally showing a process for forming a pressed metal article from metal powder prepared by a method of the present invention.
Figure 3A:
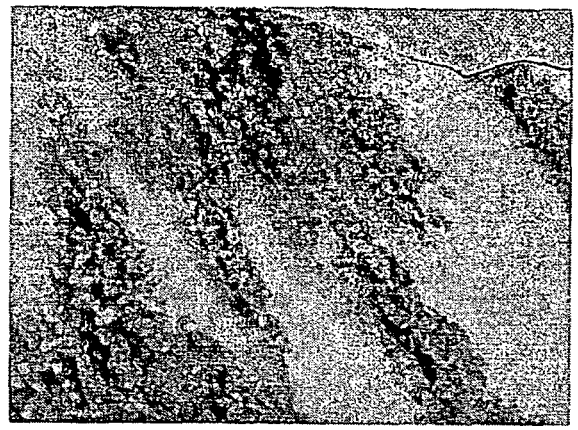
FIGS. 3A-3F are photomicrographs of pressed metal articles as described in the example set forth herebelow.
Figure 3B:
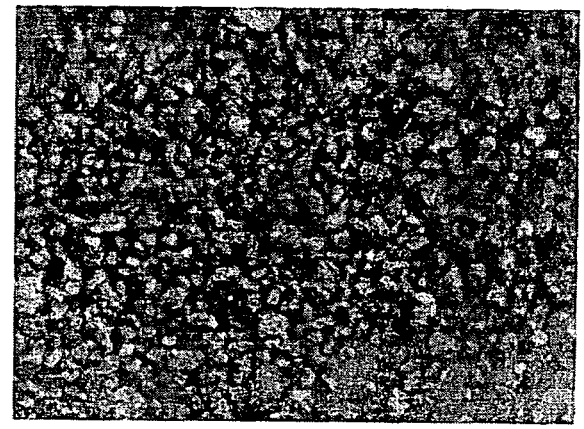
Figure 3C:
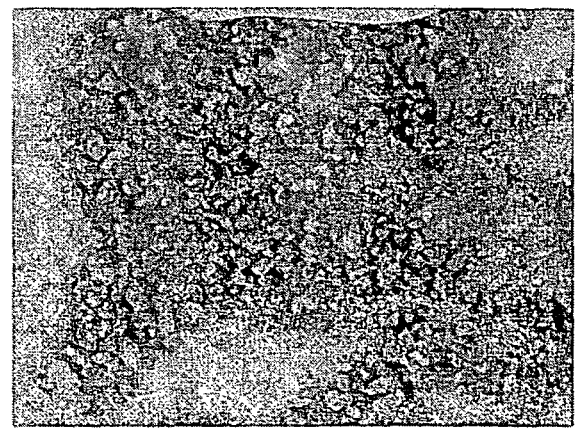
Figure 3D:
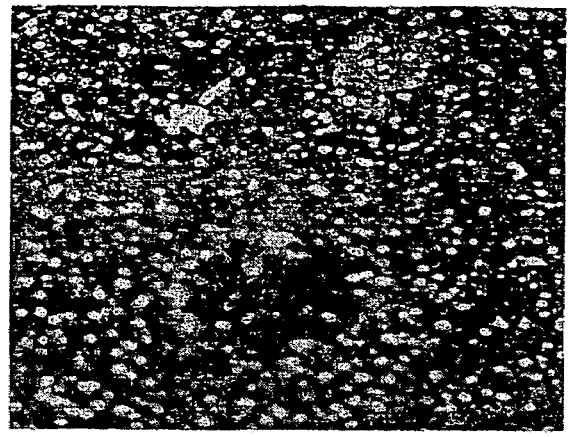
Figure 3E:
Figure 3F:
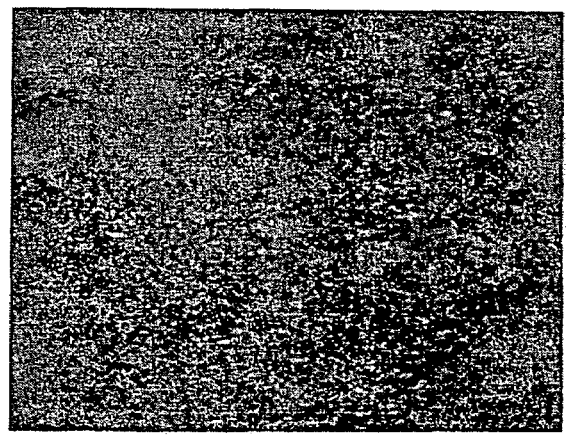

The methods of the present invention are generally illustrated in the flow diagrams appended hereto as FIGS. 1 and 2. The following example illustrates, in non-limiting fashion, the manner in which the present invention may be applied to manufacture articles such as bearings.

EXAMPLE

Preparation of Pressed Metal Articles Using Metal Powder Obtained from Acid Mine Drainage The Commonwealth of Pennsylvania Department of Environmental Protection operates a facility in Brandy Camp, Pa. where hydrated lime and a polymer are added to acid mine drainage to cause a precipitate to form as sludge that contains calcified iron oxide or iron calcium (Fe/Ca). In the past, this sludge was used as backfill for surface mining operations or was hauled away to a landfill at substantial expense. A dried form of this sludge has been made commercially available for use as a pigment for concrete, paint and mulch.

Applicants have devised new methods for utilizing this precipitate (e.g., sludge) in the manufacture of sintered and/or pressed metal articles.

First, the precipitate (e.g., sludge) was separated from standing water and the wet precipitate was placed in iron containers known as "boats." The wet precipitate filled containers were then placed on a conveyor belt which moved at a rate of 4 inches per minute through a nitrogen/hydrogen filled electric furnace that has three temperature zones set at 1400° F., 1800° F. and 1800° F., respectively. The furnace used in this example was a Sinterite™ furnace available commercially from Gasbarre Products, DuBois, Pa. Prior to entering the furnace, the precipitate had an appearance similar to that of wet bread dough. The dry precipitate that exited the furnace was in the form of large, irregular shaped particles that were grayish/red in color. The weight of the wet precipitate entering the furnace was 937 grams. The weight of the dry precipitate exiting the furnace was 114 grams. Thus, a weight loss of 88% was effected by the drying process. An elemental analysis of this dry precipitate was performed and the results of such elemental analysis are shown in Table 1 below:

TABLE 1

| ELEMENTS | RESULTS |
| --- | --- |
| Aluminum | 3.6 % |
| Nickel | .11 % |
| Manganese | 3.6 % |
| Chromium | <.02 % |
| Zinc | .004 % |
| Calcium | 26.0 % |
| Magnesium | 3.08 % |
| Copper | .04 % |
| Molybdenum | <.01 % |
| Barium | <.01 % |
| Iron | 34.0 % |
| Silicon | 5.3 % |

The dry precipitate was then removed from the containers and crushed using a mortar and pestle. It will be appreciated that, although a mortar and pestle is used in this example, in commercial or other applications of the invention, other pulverization, trituration, powder formation, particulation and/or atomization techniques may be used to turn the dried precipitate into a powder of the desired consistency. In some such techniques, the dry precipitate may be heated or melted and then atomized using techniques known in the art of powdered metal manufacturing to form particles of a size suitable for the desired pressed metal application.

The crushed dry precipitate was then sieved and dry precipitate powder that would pass through a number 80 sieve (i.e., particles of approximately 180 microns or less in diameter) was isolated. In some cases, additional bronze powder (NB-0 from SCM Metal Products in Raleigh N.C.) was then added to the dry precipitate powder. It will be appreciated that, although bronze powder is added in this example, the powder preparations of the present invention may contain various other added metal powders including virgin or substantially pure metal powders (e.g., those meeting applicable ASTM powdered metal standards such as ASTM-B783 (ferrous metal powder) or ASTM-B438 (non-ferrous metal powder). Non-limiting examples of substantially pure metal powders that may be combined with powder obtained from the acid mine drainage precipitate in accordance with the present invention include but are not limited to iron powder (e.g., 1000B, Hoeganaes Corp., Riverton, N.J.) and bronze or copper-tin powder (e.g., MAB-0 90% copper/10% tin, SCM Corporation, Research Triangle Park, N.C.).

In this example, four powder preparation formulations where prepared and used. These four formulations are shown in Table 2 below:

TABLE 2

Blend #1

99.25% Dry Precipitate Powder
.75% Paraffin Lubricant
AAD-1.18 g/cm3

Blend #2

89.25% Dry Precipitate Powder
10% Powdered Bronze
.75% lube
AAD-1.29 g/cm3

Blend #3

60% Dry Precipitate Powder
40% Bronze Powder
.75% Paraffin Lubricant
AAD-1.7 g/cm3

Blend #4

20% Dry Precipitate Powder
80% Bronze Powder
.75% lube
AAD-2.64 g/cm3

Blends 1, 2, 3 and 4 were then placed in dies used to form round bearings. The dies were placed in a vertical cold compaction press (Mitchell™ 12 ton molding press built in DuBois, Pa.) and compacted to form green pressed metal bearings.

The green pressed metal bearings were then passed through an electric sintering furnace to effect sintering under a Nitrogen/Hydrogen protective atmosphere for 20 minutes at temperatures ranging from 1500 F to 2070 F. The resulting sintered, pressed metal bearings had the properties shown in Tables 4 and 5 below:

TABLE 4

Maximum Pressed Density

Blend #1 = 2.42 g/cm$^3$
Blend #2 = 2.60 g/cm$^3$

TABLE 4-continued

Maximum Pressed Density

Blend #3 = 3.26 g/cm$^3$
Blend #4 = 4.96 g/cm$^3$

TABLE 5

Sintered Properties

|  | Blend #1 | Blend #2 | Blend #3 | Blend #4 |
|---|---|---|---|---|
| "K" Value | 2,881 psi | 2,794 psi | 570 psi | 11,000 psi |
| Hardness | no reading | 16 Rf | 75 Rh | 13 Rh |

These sintered pressed metal bearings were also examined microscopically using a Mark V Mettalograph™ microscope at 500× power. Photomicrographs showing a small degree of sinter are set forth in FIG. 3.

This example is non-limiting. It is provided solely for the purpose of describing some of the many possible embodiments of this invention. This example is not intended to exhaustively describe all possible embodiments of the invention. Indeed, as those of skill in the art will appreciate, various alterations, modification, additions and deletions may be made to the above-set-forth example without departing from the intended spirit and scope of the present invention.

As used in this application and the claims set forth herebelow, the term "pressed" metal is to be interpreted broadly. While the examples described herein discuss compression of the powdered metal preparation in a die to form the desired article, other methods, such as rolling or extrusion should also be included within the meaning of "pressed" metal. Accordingly, for example, powdered metal preparations of the present invention can be rolled into sheets or articles of other cross-sectional configuration and sintered in a continuous or non-continuous sintering. Powder rolling of this type is normally at a rate that is slow enough to allow air to be expelled from the powder as it is compressed by the roller. Also, although the sintering process is described herein as occurring subsequent to the compression process, in some instances, the compression (e.g., die compression, rolling, extrusion) and sintering processes may be carried out simultaneously or in combination, such that the pressed metal is exposed to high (i.e., sintering) temperatures while in the die, roller, extruder or other compression apparatus.

In some embodiments of the inventions, powdered metal preparations of the present invention may be sintered without compression to form desired articles.

It is to be appreciated that the invention has been described hereabove with reference to certain examples or embodiments of the invention but that various additions, deletions, alterations and modifications may be made to those examples and embodiments without departing from the intended spirit and scope of the invention. For example, any element or attribute of one embodiment or example may be incorporated into or used with another embodiment or example, unless to do so would render the embodiment or example unsuitable for its intended use. Also, where the steps of a method or process are described, listed or claimed in a particular order, such steps may be performed in any other order unless to do so would render the embodiment or example not novel, obvious to a person of ordinary skill in the relevant art or unsuitable for its intended use. All reasonable additions, deletions, modifications and alterations are to be considered equivalents of the described examples and embodiments and are to be included within the scope of the following claims.

What is claimed is:

1. A method for the recovery of iron-bearing powder from acid mine drainage, said method comprising the steps of:
   A) obtaining a wet metal-containing precipitate that has been formed by treatment of metal-containing acid mine drainage and separated from standing water, said wet metal-containing precipitate comprising iron and calcium as the two most prevalent metals by weight percentage;
   B) heating the wet metal-containing precipitate in an oxide reducing atmosphere at a temperature of approximately 400° F. to approximately 2070° F. to i) dry the wet metal-containing precipitate, ii) at least partially reduce any oxides, and iii) form a dry iron-bearing precipitate;
   C) processing the dry iron-bearing precipitate to form an iron-bearing powder suitable for later sintering; and
   D) combining a lubricant with said iron-bearing powder obtained in Step C.

2. A method according to claim 1 further comprising the step of:
   adding additional metal powder to the iron-bearing powder obtained in Step C to form a supplemented powder.

3. A method according to claim 2 wherein the additional metal powder comprises bronze powder.

4. A method according to claim 2 wherein the additional metal powder comprises iron powder.

5. A method according to claim 2 wherein the additional metal powder comprises copper powder.

6. A method according to claim 1 wherein the lubricant comprises paraffin or a paraffin-containing lubricant.

7. A method according to claim 1 wherein the lubricant acts as a die release agent.

8. A method according to claim 1 further comprising the step of:
   removing at least a portion of an undesirable material from i) the wet metal-containing precipitate composition obtained in Step A and/or ii) the dry metal-containing precipitate obtained in Step B and/or the iron-bearing powder obtained in Step C.

9. A method according to claim 8 wherein the removing step comprises removing calcium.

10. A method according to claim 8 wherein the removing step comprises removing a material that was added to the acid mine drainage to facilitate formation of the precipitate obtained in Step A.

11. A method according to claim 10 wherein the undesirable material comprises a polymer.

12. A method according to claim 8 wherein the removing step comprises applying heat to cause thermal degradation of the undesirable material.

13. A method according to claim 8 wherein the removing step comprises:
   adding a solvent that dissolves calcium but not iron such that a calcium containing solution is formed; and
   separating and removing the calcium-containing solution.

14. A method according to claim 9 wherein the removing step comprises:
   adding a compound that binds to or reacts with calcium but not iron to form a calcium-containing compound or complex; and
   separating and removing the calcium containing compound or complex.

15. A method according to claim 10 wherein the removing step comprises using a magnetic field to separate iron and any other ferromagnetic material from calcium and any other non-ferromagnetic materials present in i) the wet metal-containing precipitate composition obtained in Step A and/or ii) the dry metal-containing precipitate composition obtained in Step B and/or iii) the iron-bearing powder obtained in Step C.

16. A method according to claim 1 wherein Step B comprises heating the wet metal-containing precipitate in an atmosphere that consists of or comprises nitrogen and/or hydrogen.

17. A method according to claim 1 where Step B comprises heating the wet metal-containing precipitate in an oxide reducing atmosphere to a temperature of approximately 500° F. to approximately 1800° F.

18. A method according to claim 1 wherein Step B comprises passing the wet iron-containing precipitate through a furnace that has at least a first, second, and third temperature zones, the first temperature zone having a temperature of approximately 1397° F. to approximately 1403° F., the second temperature zone having a temperature of approximately 1795° F. to approximately 1803° F. and the third temperature zone having a temperature of approximately 1795° F. to approximately 1803° F.

* * * * *